United States Patent
Fogelman et al.

(10) Patent No.: US 7,964,029 B2
(45) Date of Patent: Jun. 21, 2011

(54) PROCESS FLOWSTREAM COLLECTION SYSTEM

(75) Inventors: Kimber D. Fogelman, Hockessin, DE (US); Vincent Worley, Wilmington, DE (US); Peter Sullivan, Newark, DE (US)

(73) Assignee: Thar Instrument, Inc., Pittsburgh, PA (US)

( * ) Notice: Subject to any disclaimer, the term of this patent is extended or adjusted under 35 U.S.C. 154(b) by 757 days.

(21) Appl. No.: 11/487,581

(22) Filed: Jul. 17, 2006

(65) Prior Publication Data

US 2008/0010956 A1    Jan. 17, 2008

(51) Int. Cl.
*B01D 50/00*    (2006.01)
(52) U.S. Cl. .......... 96/155; 96/413; 73/863.21; 137/171
(58) Field of Classification Search .............. 55/319; 137/171; 96/108, 155, 413; 95/156; 73/863.21
See application file for complete search history.

(56) References Cited

U.S. PATENT DOCUMENTS

| | | | | |
|---|---|---|---|---|
| 1,817,048 A * | 8/1931 | Washburn | ...................... | 159/4.1 |
| 2,461,342 A * | 2/1949 | Obreiter, Jr. | ...................... | 62/83 |
| 2,958,189 A * | 11/1960 | Britton et al. | .................. | 60/776 |
| 3,224,173 A * | 12/1965 | Webb | .............................. | 55/408 |
| 3,234,716 A * | 2/1966 | Sevin et al. | ................. | 210/360.1 |
| 4,824,570 A * | 4/1989 | Bethuel et al. | ............... | 210/511 |
| 5,993,747 A * | 11/1999 | Mandel | ........................ | 422/119 |
| 2002/0070169 A1 | 6/2002 | Berger et al. | | |
| 2002/0070170 A1 | 6/2002 | Berger et al. | | |
| 2002/0074509 A1* | 6/2002 | Quill | ........................ | 250/432 R |
| 2002/0078826 A1* | 6/2002 | Day | .............................. | 95/219 |
| 2002/0139752 A1 | 10/2002 | Berger et al. | | |
| 2002/0144949 A1 | 10/2002 | Berger et al. | | |
| 2004/0000236 A1* | 1/2004 | Linnersten et al. | ............. | 95/287 |

* cited by examiner

*Primary Examiner* — Duane Smith
*Assistant Examiner* — Christopher P Jones
(74) *Attorney, Agent, or Firm* — Debra Z. Anderson

(57) ABSTRACT

A device and process for separating liquid and gas phases in a flowstream containing a liquefied gas or supercritical fluid under pressure mixed with a liquid. A splitter vessel separates the liquid from gas phases and transfers liquid to a collection container while conducting the gas phase out of the splitter. Separation of liquid phase out of the flowstream is provided without additional pressure schemes or solvent extractions imposed on the stream.

5 Claims, 9 Drawing Sheets

PROCESS FLOWSTREAM COLLECTION SYSTEM

FIELD OF THE INVENTION

The present invention relates to sampling and collecting from a process flowstream containing a liquefied gas or supercritical fluid under pressure mixed with a liquid.

BACKGROUND OF THE INVENTION

In general, many process systems contain a mobile flowstream containing a liquefied gas or supercritical fluid under pressure mixed with a liquid. Any dissolved liquid samples or components of interest carried through the process system will also remain dissolved in the flowstream. The principle that simple decompression of the mobile phase flowstream separates the stream into two fractions has great importance with regard to recovering liquid phase out of the flowstream. Removal of the gaseous phase, which can constitutes 50% to 95% of the flowstream during normal operation is critical to successful and efficient recovery of the liquid phase.

In prior collection systems for supercritical chromatography systems, the separation of liquid and gas phases within the process flowstream is enhanced by expanding the flow path prior to entering a collection container, thus eliminating the need to pressurize the collection container. Typically, when the gaseous phase of the flowstream exits at a cold temperature from a flow tube in a room-temperature collection container causing the gas to heat up. When a collection container is filling with liquid phase, the heating and expansion of the colder gaseous phase can cause an effervescence of bubbles at the surface of the liquid in the container, especially when the liquid level approaches to the inlet flow stream discharge. Further, this effect is not limited to only supercritical process flow systems. Any type of process that is designed to recover liquid portions from a high pressure flowstream containing a liquefied gas or supercritical fluid under pressure mixed with a liquid can experience this problem. The effervescence effect can cause an aerosol to form and result in a slight loss of liquid. Even though the loss of liquid is minimal when compared to a much larger volume of liquid collected from the flow stream, some solids dissolved in the liquid phase are potentially carried out of the collection device via the aerosol into a waste gas phase stream. The solids can precipitate from the aerosol and cause build-up and blockages in the outlet line leading from a collection device or a buildup of solids on liquid level sensors in the collection device.

Further, as the collection device fills with liquid, the expanding gaseous phase in the device creates some pressurization of the device before it escapes in an outlet line, for example five to fifteen PSI, even if the pressurization is not necessary for gas/liquid separation. Other parts of the waste flow stream may induce higher backpressure than is necessary for gas/liquid separation. Many collection devices are not manufactured to withstand even moderate pressurization. Thus, for many large size (one liter or more) collection bottles, even moderate amounts of pressure could cause breakage that would spill valuable liquid samples collected from the system.

SUMMARY OF THE INVENTION

The device and process of the preferred and alternative embodiments efficiently separate liquid and gas phases from a flowstream containing a gas or supercritical fluid under pressure mixed with a liquid and collects the liquid fraction at or near atmospheric pressure in a collection splitter device that is separate from a collection container. Separation of liquid samples out of the flowstream is provided without additional pressure schemes or solvent extractions imposed on the flow stream samples.

Aerosol formation of the liquid phase is a common problem in sample collection from a flowstream containing a liquefied gas or supercritical fluid under pressure and mixed with a liquid. This is a significant cause of loss of the liquid phase that contains dissolved, and usually valuable, solute(s) of interest. Higher temperatures may reduce the aerosol generation, and the composition of the separated phases also is a factor.

To collect liquid samples out of the high pressure flowstream, a decompression point for the flowstream is located prior to, and separated from, the collection vessel. Initial separation of the liquid phase sample from gas phase occurs immediately at the point of initial decompression. By providing an upstream restriction from the point of decompression, such as a backpressure regulator, a minimum backpressure sufficient to prevent an explosive expansion of gas from the flowstream, prevent precipitation of solids, and/or freezing of transfer lines can be maintained in the collection system and transfer lines.

The preferred embodiment of the collection splitter device provides for rapid separation of volumes of the sample fractions from the high pressure flowstreams described above. Zones of restricted or unrestricted separation and flow within the splitter provide for separation of the mixed flowstream. The result directs separated gas up and out of the splitter container while preventing gas from following the separated liquid down via gravity to a collection container located away from the splitter. The aerosolization effect at the surface of a volume of collected liquid phase in the high-pressure system is avoided by moving the gas/liquid separation process away from the liquid volume collection device. In the present invention, this means that the splitter device is a chamber that is separate and distinct from the point of liquid phase sample accumulation.

BRIEF DESCRIPTION OF THE DRAWINGS

For a better understanding of the nature of the present invention, its features and advantages, the subsequent detailed description is presented in connection with accompanying drawings in which.

DETAILED DESCRIPTION OF THE INVENTION

The preferred embodiment is used in the collection process of liquid phase samples or flow from a flowstream. The liquids can be from all or part of a process flow system containing a liquefied gas or supercritical fluid under pressure mixed with a liquid and collects the liquid phase separated from the flowstream at or near atmospheric pressure. The preferred embodiment can be use for reaction monitoring, process control, preparative chromatography and extraction using supercritical and near critical materials.

Figure 1:
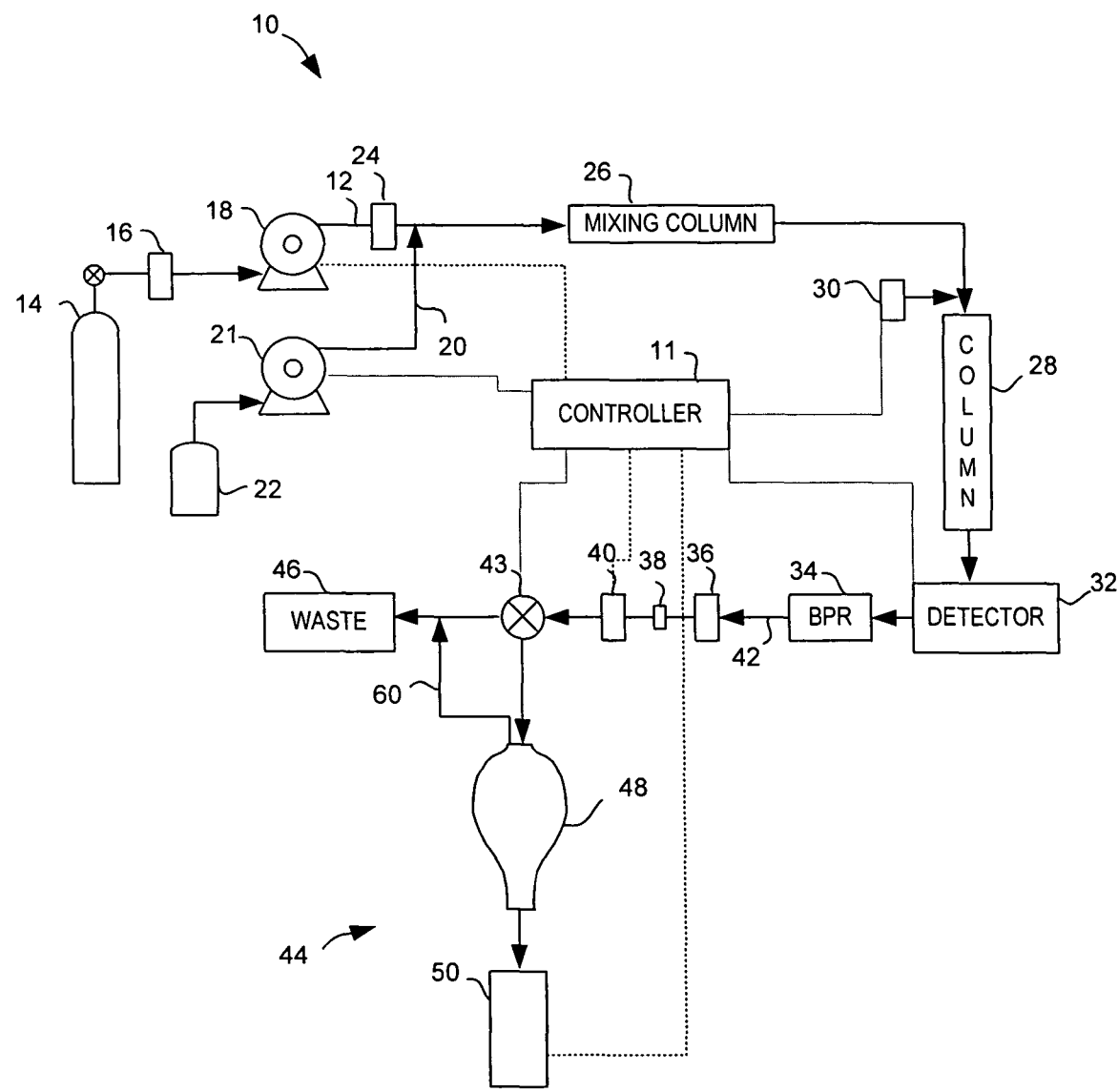
FIG. 1 illustrates the preferred embodiment connected to a chromatography system.
Figure 2:
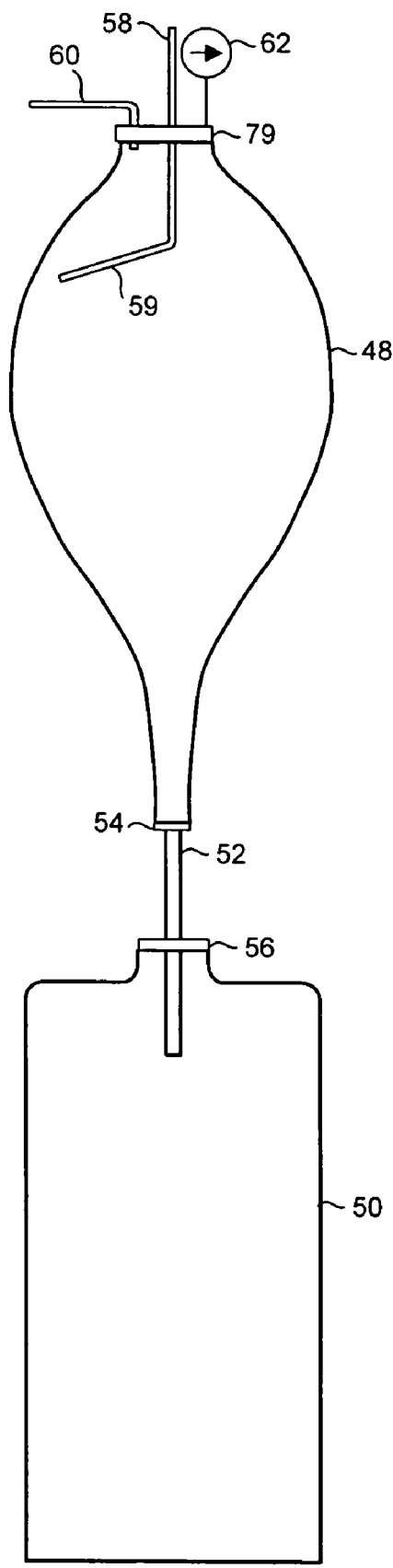
FIG. 2 illustrates a detailed view of the preferred collection splitter.
Figure 3:
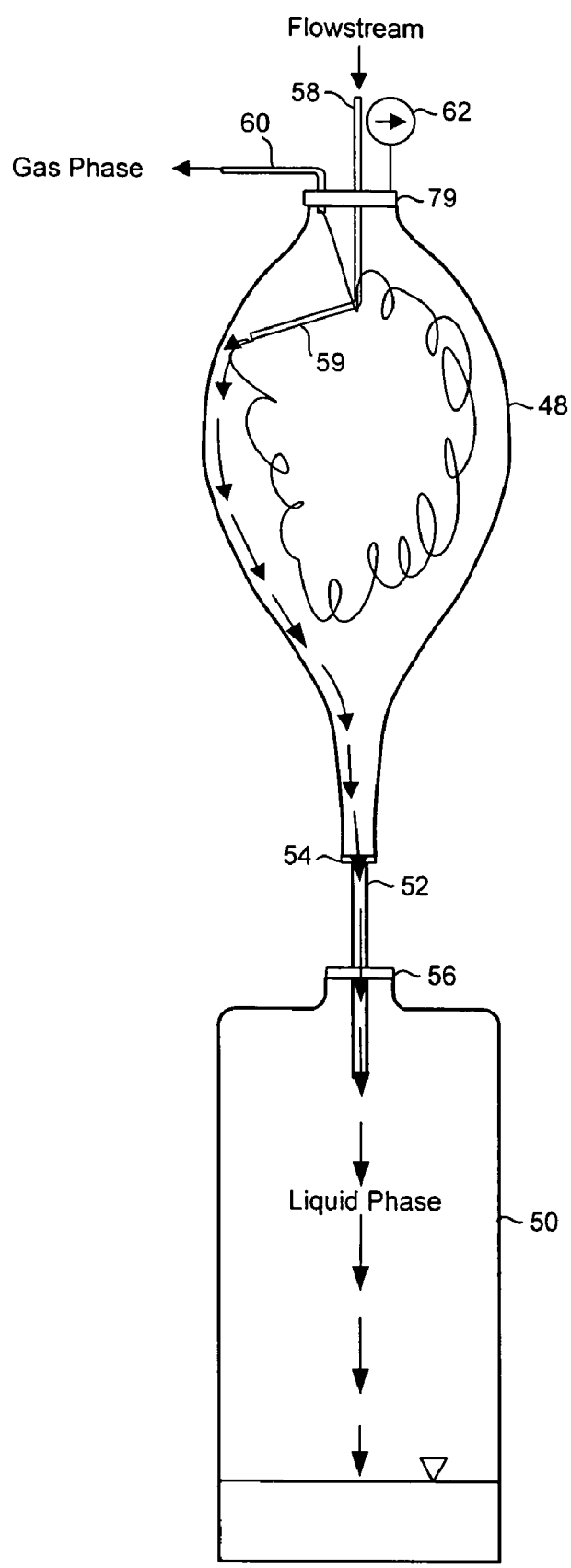
FIG. 3 illustrates flow of mobile phases through the preferred collection splitter.

Referring to FIG. 1 and the exemplary method shown in FIG. 2, a flowstream is created in the system 10 whereby a sample can be injected S80 via injection valve 30 into chromatography column 28, where the sample components of interest are separated S81. To begin a gentle, physical separation of the gas phase from the liquid phase in the flowstream S82, it is usually beneficial to slow the velocity of fluids within the transfer tubing 42. The fluid velocity is slowed inside the transfer tubing by 42 placing a restrictive orifice or an equivalent restrictions such as a smaller diameter tube or valve immediately downstream from first heater in the series if heater are implemented in a system. The high-pressure, high velocity flowstream exits heater 36 and enters a restrictive orifice implemented as a flow restrictor 38, which provides a higher backpressure through heater 36 and thereby slows the flowstream and increases the contact time of the of liquid phase to the heater 36. The restrictor 38 also insures a high enough backpressure to prevent freezing of liquid in the flowstream or precipitation of solutes out of the flowstream. The restriction increases the backpressure in the heated zone and reduces the amount of gas expansion.

In the exemplary system of the mixed flowstream, it is also necessary to apply thermal conditioning of the flowstream to prevent uncontrolled cooling of fluids within the transfer lines due to rapid expansion of the gas phase during gas/liquid separation processes that occur within the transfer lines. Without thermal control, freezing of the flowstream within the lines and connections will occur, causing clogging and system shutdown. To gently heat the transfer tubing in the areas where separation processes begin to occur, passes tubing 42 passes through the trim heaters 36 and 40. Alternatively, the entire separation components that further include valve 43, splitter 48, and attached transfer lines could be heated to counter any uncontrolled cooling that occurs. In an alternative exemplary embodiment, the velocity of fluids can be slowed after all heaters, however, such a configuration may not control the final expansion of gas phase. As a result, the ability to actively suppress aerosol formation within the transfer lines and within the collection system may be diminished. After exiting the trim heater 40, flow is directed into the collection system. Alternative systems could direct portions of the flowstream to different collection systems, as inlets to different processes, or to a waste stream. Sensors and controllable components of system 10 are connected to a controller 11 that receives data from and controls the pumps, 18 and 21, detector 32, heaters 36 and 40, valve 43, and collection container 50.

The preferred embodiment can passively separate liquid phase flow from the gas phase at or near atmospheric pressure, without applying a pressure scheme to the separation or the collection vessel. Instead of expanding and separating the mobile phase flow in a collection device under a pressure force, a vessel is provided in the flowstream prior to flow entering a collection vessel. In FIG. 1 and in the more detailed illustration in FIG. 2, the preferred embodiment of the collection vessel is illustrated as a gas and liquid phase separation splitter 48 that is set apart from the end-point liquid phase collection container 50. Splitter 48 receives the mobile flow stream from transfer tube 58 that is connected to valve 43. Splitter 48 can receive either continuous flow or an intermittent, pulsed flowstream. Splitter 48 depressurizes the mobile flowstream and allows gasses to expand out of the flowstream for conducting to a waste gas line 60 using venting, pumping, or vacuum processes. By allowing the flowstream to gently expand in the hollow chamber of splitter 48, gasses are separated S84 from the liquids with minimal or no creation of aerosols.

Exposing the flowstream to a larger-diameter splitter 48 slows the stream's linear velocity, allowing gas to expand and separate from the flowstream. Slowing the linear velocity reduces the magnitude of shear forces occurring between mobile stream gasses and the liquid flow stream in transfer lines leading to a collection vessel. By lowering shear forces in the flow stream, there is less tendency for the stripping of liquid phase into separated gasses, thereby creating an aerosol. Stripping forces cause aerosols, containing liquid samples, to escape collection and proceed into the waste discharge, thereby losing valuable volumes of samples.

When a flowstream volume enters the splitter, the hollow internal volume of splitter 48 causes the gasses in the biphasic flowstream to expand and separate from the liquids. Liquid drains along walls of splitter 48, through transfer tube 58 to collection vessel 50 and gasses that have been substantially separated from the liquids leave the splitter. As a result, the flow stream does not re-aerosolize or disturb liquid being collected in a collection vessel 50. Although some minimal pressure exists inside splitter 48 during a process run due to backpressure from the gas stream, no pressure scheme is applied in the splitter 48 or collection vessel 50.

Referring to FIG. 3, when discharging the mobile phase flow stream in the splitter 48 chamber, the flowstream should discharge against the inner wall of the splitter on a downward angle from horizontal on the down-sloping part of the splitter wall. If the flowstream strikes the wall of the splitter at a horizontal angle or upward angle above horizontal, an undesirable effect of the upward force causes the liquid to aerosolize or to remain combined with the gas and can be lost through waste stream 60. The delivery tube 59 is brought arbitrarily close to the wall of splitter 48 but does not need to be positioned against or parallel to the inner splitter wall since the separation of the flowstream does not use a cyclonic separation technique. However, discharging the flowstream against the wall of the splitter from a delivery tube placed close to the wall reduces the potential for aerosol formation. When the flowstream contacts the splitter wall, the flow stream spreads over a much larger surface area in which to escape at or near atmospheric pressure, and it allows the gas in the thinned flowstream a greater surface area to escape from the liquid. The pressures within the splitter in operation of the preferred embodiment range at less than 5 p.s.i. The liquid phase may swirl around the splitter prior to draining down into the collection container 50, but this effect is not necessary for separation and collection of the liquid phase stream. It is undesirable to direct the discharge tube 59 becomes angled straight down towards drain tube 52, since this would cause a turbulent discharge of the flowstream resulting in aerosol formation.

The splitter 48 is preferably formed cylindrically with tapered, open ends that are smaller in diameter than the chamber of the splitter. As described more fully below, alternative shapes of splitter 48 may vary by size and shape yet still fall within the scope of the claimed invention. The length of either the tapered, bottom-end 47 of the splitter 48 and/or a drain tube 52 should be sufficiently long so that the liquid phase samples separated from the gasses in the flowstream are sufficiently unaffected by the gasses escaping out of the splitter 48. This length 47 will vary depending upon the flow rate of the process system 10, the volume of samples being collected, and the chemical and physical compositions of the flowstream.

The sample collection container 50 is connected to splitter 48 via transfer tube 52 to catch liquid phase that gravity-drains S86 into liquid phase collection container 50. Drain tube 52 is connected to splitter 48 with a pressure-resistant and leak-proof connector 54 and is connected to collection container 50 with an equivalent connector 56. Splitter 48 is connected to a gas phase vent line 60 near the top-end of splitter 48 (the bottom-end of splitter 48 being the end connected to gravity drain tube 52). Gasses emanating from the phase-separated mobile flow stream are conducted out of splitter 48 by venting or removal through transfer tube 60 to waste line 46.

Although the splitter has no pressure applied from devices in the collection system, the splitter becomes mildly pressurized during separation processes because of the discharge of the gas phase in the splitter 48 and restrictions to the collection vessel 50 and waste line 46. The pressurization is useful for safety and waste flow purposes to ensure elimination of gasses out of the splitter 48. For example, one implementation of the splitter 48 resulted in pressures ranging from atmospheric up to 5 p.s.i. within the splitter 48 during operation. However, the splitter can operate with internal pressures at 100 p.s.i. or less provided that the splitter materials of manufacture are properly specified to handle higher pressures. A pressure gauge and sensor 62 may be installed at the splitter to monitor pressure inside splitter 48.

Removing the liquid sample collection from a gas/liquid separation function provides important advantages of using nearly any volume of liquid phase to be collected in any size of collection container 50 desired. Most separated gasses are prevented from entering the collection container 50 due to the restriction between the splitter and collector. This also allows even small amounts of liquid recovery. The preferred embodiment creates zones within the splitter to provide for separation of the mixed flowstream. The result directs separated gas up and out of the splitter container while directing separated liquid down via gravity to a separate collection container. The increased diameter of the body of the splitter provides a zone within the wider diameter body for gas to separate, rise, and exit the splitter unrestricted. The reduced diameter at the splitter bottom creates a restricted zone for the gas that disrupts any of the separated gas from traveling down the bottom of the splitter, though a connection tube, and into the collection container. However, the restricted zone must also provide unrestricted flow of the separated liquid phase out of the bottom of the splitter and into the collection container. As described herein, the preferred splitter will vary in diameter and volumetric capacity according to the flowrate, liquid/gas mixture percentage and composition of the flowstream, and pressure of the flowstream in the laboratory or industrial scale system. However, regardless of the size of the splitter applied to a particular flowstream, the two zones of unrestricted gas separation and gas restriction/unrestricted liquid flow must be maintained to cause the desired effects of passive liquid collection to a collection container located away from the separation zones. Even though gasses are restricted from the collection vessel 50, some separated gasses from splitter 48 will still enter container 50, but because of the narrow, restricted drain tube 52 the vast majority of gas exits splitter 48 through waste line 60.

Since the splitter chamber 48 performs the function of "splitting" the process flowstream into separate gas and liquid flowstreams, an aspect of the various possible design proportions maintains the bottom-end of the splitter and the drain tube at a narrow enough diameter to minimize the gas from the flowstream from entering into the collection container 50. Gas re-contacting the liquid phase could cause re-aerosolization of liquid samples that have already been separated and collected into container 50. The diameter and length of tube 52 should be specified according to the volumetric flow, velocity, and composition of gas versus liquid in the process flowstream. The tube 52 should be restrictive to gasses so as to disallow gasses within the splitter 48 from freely passing through tube 52 and entering a collection device. Another aspect of splitter 48 is that the diameter of the bottom-end of splitter 48 and the diameter of drain tube 52 are not so restrictive as to prevent liquid phase from draining into container 50 without backing up into splitter 48 and will also not prevent any quiescent gasses from rising up out of container 50 and entering into splitter 48 to eventually discharge as waste.

These design considerations take into account that if effervescence of liquid does occur in collection container 50 due to gas entering the container 50, the possibility of re-aerosolization of liquids that could be swept back into splitter 48 is significantly reduced. This configuration provides for scalable collection of liquid samples for example from fifty milliliters up to twenty liters or more simply by changing the scale and geometry of the collection system 44.

Figure 4A:
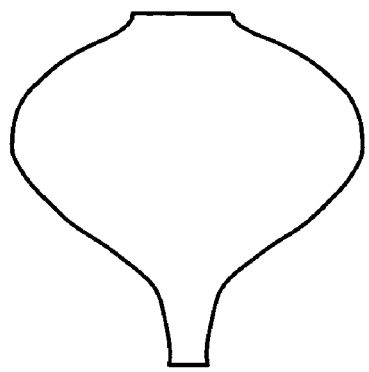
FIGS. 4(a) to 4(c) illustrate alternative embodiments of the collection splitter.
Figure 4B:
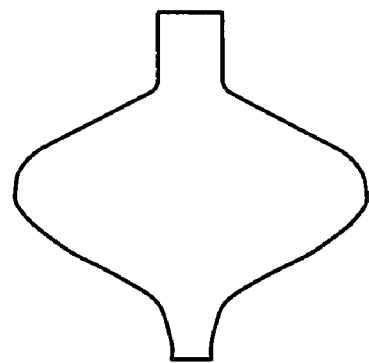
Figure 4C:
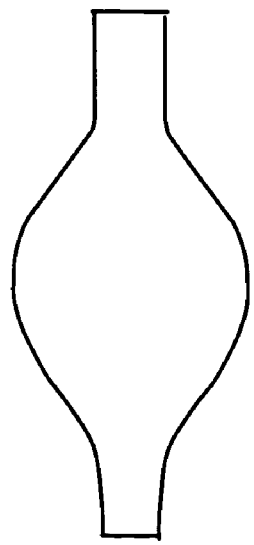

FIGS. 4*a*-4*c* illustrate alternative embodiments of splitter 48. The preferred embodiment of splitter 48 is illustrated in FIGS. 1 and 2 as generally perpendicular teardrop design that provides adequate expansion and separation of the flowstream and a smooth transition of the inner walls for gravity draining of liquid phase samples to the bottom of each splitter. FIG. 4*a* shows an alternative splitter 64 comprising a larger diameter of internal separation space. FIG. 4*b* shows an alternative splitter 66 having a more straight-walled separation space but still retaining smoothed transitions in the walls that lead down to a lower end for gravity draining of liquids. FIG. 4*c* shows yet another alternative embodiment of a splitter 68 that has a curved walled design that is more uniform in shape than splitter 48 and narrower in shape than alternative splitter 64.

The shape of splitter 48 is preferably formed with a smooth inner wall that gradually decreases in internal cross-sectional area or diameter, which allows the liquid phase separating out of the flowstream to traverse down the inner wall under gravity flow and collect at the bottom of the device without forming droplets on ridges, bumps, or transitions in the inner wall. The discharge tube carrying the initial flowstream into splitter 48 is preferably directed at an angle less than horizontal inside the splitter to discharge liquid samples downward from horizontal towards the down-sloping section of the splitter wall. This design provides the advantages of collecting liquid samples to container 50 while preventing spraying the incoming flowstream upwards causing aerosolization and loss of sample. As one skilled in the art will observe, the sizes and volumes of collection system 44 of the preferred embodiment are exemplary.

The splitter wall is preferably formed with a decreasing diameter towards the bottom end and is not entirely perpendicular to horizontal. Although it would still function as a splitter and is included in the scope of alternative embodiments, a perpendicular inner walled vessel such as a true cylindrical or rectangular shape with flat ends could cause the undesirable effects of deflection of liquid phase fractions substantially upward inside the splitter resulting in further aerosolization (and loss of liquid through the vent line 60) and/or cause pooling of liquid on a flat bottom of such a design. As a further example, an alternative of the splitter 48 could be constructed as a three-dimensional diamond shape, but such a formation would not function as efficiently as those shown in FIGS. 4a-4d. One skilled in the art will understand that exact sizes, shapes, flow stream capability, and materials of construction of the splitter may vary depending on linear velocity, volumetric flow rate, configuration and size of the system assembly, composition of the flowstream, and other factors incorporated into a process design and operation. For example, an industrial implementation would scale the splitter and collection container design and construction materials for high capacity and strength.

The splitter 48 should be constructed with inert glass, plastic, composite, or metal materials appropriate for and compatible with samples and compounds being collected from the flowstream. Although not necessary for the present invention, for safety purposes, any device used as a gas/liquid splitter should have adequate strength to withstand potentially dangerous pressure fluctuations associated with the upstream process being operated. For example, glass splitters may be treated with a shatter-resistant coating.

In FIG. 1, collection container 50 is the final liquid stream collection point in the system 10. However, the separated liquid phase could be directed to any collection unit desirable or fed as an inlet flowstream to an additional process. Container 50 may be constructed of glass, plastic, or metal capable of handling the liquid under collection, and the preferred embodiment used plastic-coated glass as a safety factor against possible breakage due to an improper overpressurization of the collection system.

Figure 5:
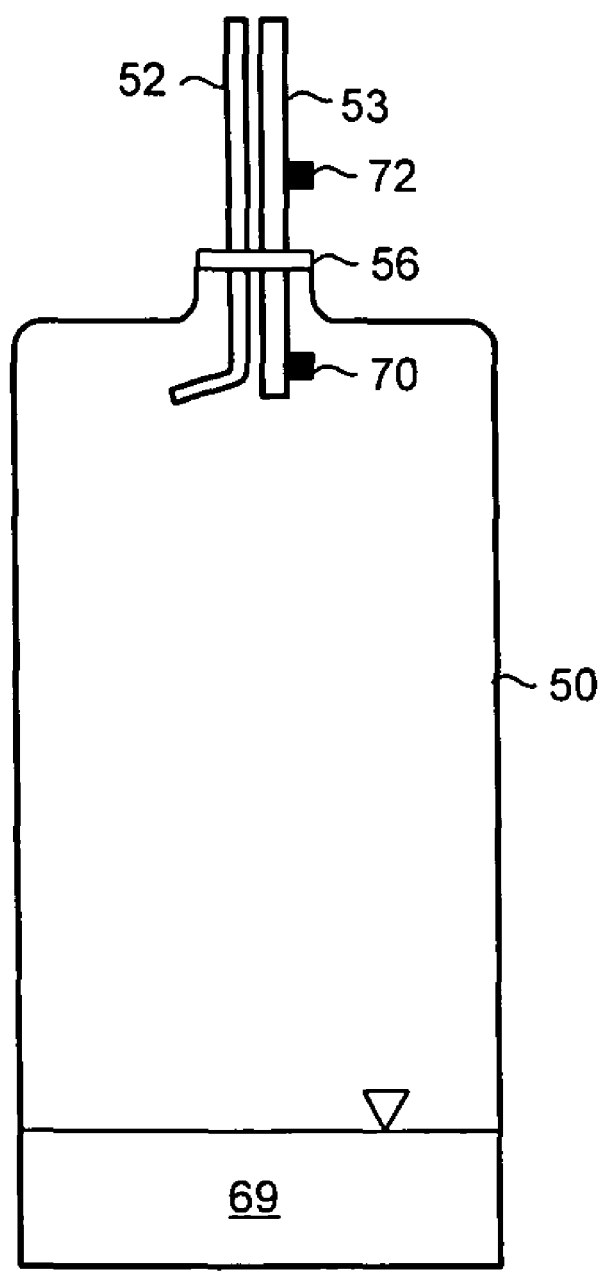
FIG. 5 illustrates the preferred collection splitter with liquid level sensors.

During separation of the flowstream, some gas may enter the collection container 50 along with liquid flow. This de minimis gas flow can be integrated into an automation of collection system 44. To prevent leaks out of the container 50, cap 56 should be sealed with an appropriate seal such as an O-ring. FIG. 5 shows a detailed view of collection container 50 with a dip tube 53 and various liquid level sensors to monitor liquid levels S88 in container 50. Dip tube 53 passes through cap 56 into container 50. As the liquid 69 of liquid phase fractions rises in container 50, the reservoir air space, which may contain some gas entering from splitter 48, compresses slightly. The dip tube 53 is preferably a clear plastic tube that has a first capacitance sensor 70 and a second capacitance sensor 72 attached to the tube 53. The sensors are calibrated to require a greater thickness of liquid in the dip tube 53 than merely a liquid film draining through tube 53. The dip tube 53 is positioned to reach into collection container 50 such that when the liquid level 68 reaches the bottom of the dip tube 53, the reserve air has no place to vent and (previously up through tube into splitter 48 and waste tube 50) the container reaches a point that the liquid phase draining into container 48 begins filling dip tube up until it fills past first sensor 70.

Sensors in system 10 can be connected to controller 11 that determines collection container 50 is nearly full, and the controller triggers an action to prevent overfilling of container 50. One action is to signal processes feeding the flowstream into the process system to stop production and introduction of the flowstream into the system 10. This action allows flowstream already sent to the collection system to complete separation in splitter 48. After stopping the flow into collection system 40, a final volume of the flowstream has passed through the collection system 10, the liquid phase is drained from splitter 48 into the backed-up dip tube 53. By maintaining extra airspace space within container 50, when cap 56 is opened to the atmosphere, air from container 50 escapes allowing pressure to normalize and the liquid phase in dip tube 53, that siphoned up the tube, can now gravity drain back into the collection container 50 without overfilling.

An additional second sensor 72 could also be placed higher above first sensor 70 on dip tube 53. Second sensor 72 triggers a complete system 10 shut-down that prevents any further flowstream from entering splitter 48. Even after the first sensor 70 prevents further flow into collection system 40, the system 10 may contain a greater volume of liquid that the collection container 50 can hold. The second sensor 72 notifies the system 10 that the liquid level currently in the tube 53 will completely fill collection container 50 and therefore a complete and immediate system shut-down is necessary to prevent overfilling of the collection container 50.

Figure 6:
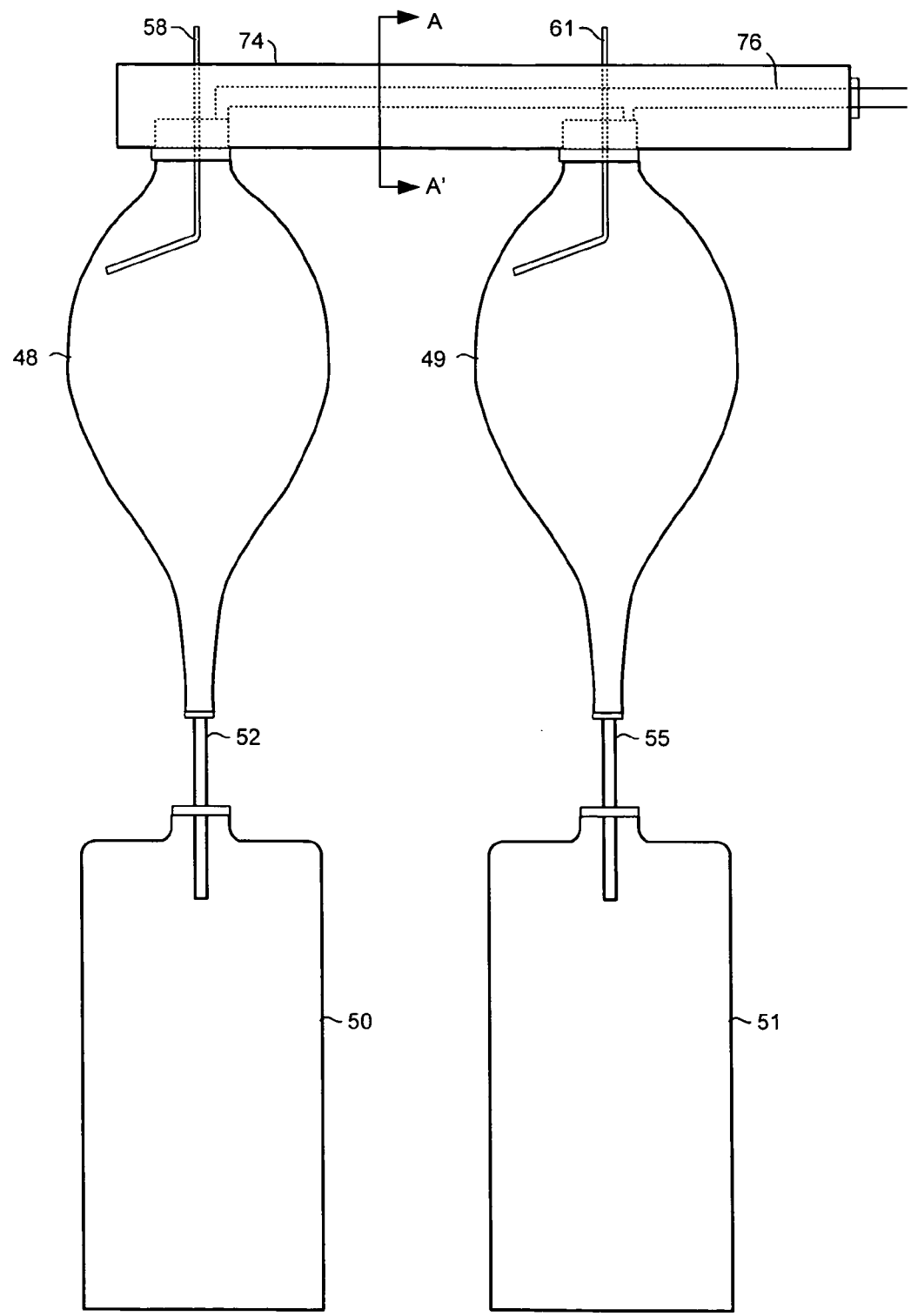
FIG. 6 illustrates the preferred embodiment in a support frame.
Figure 7:
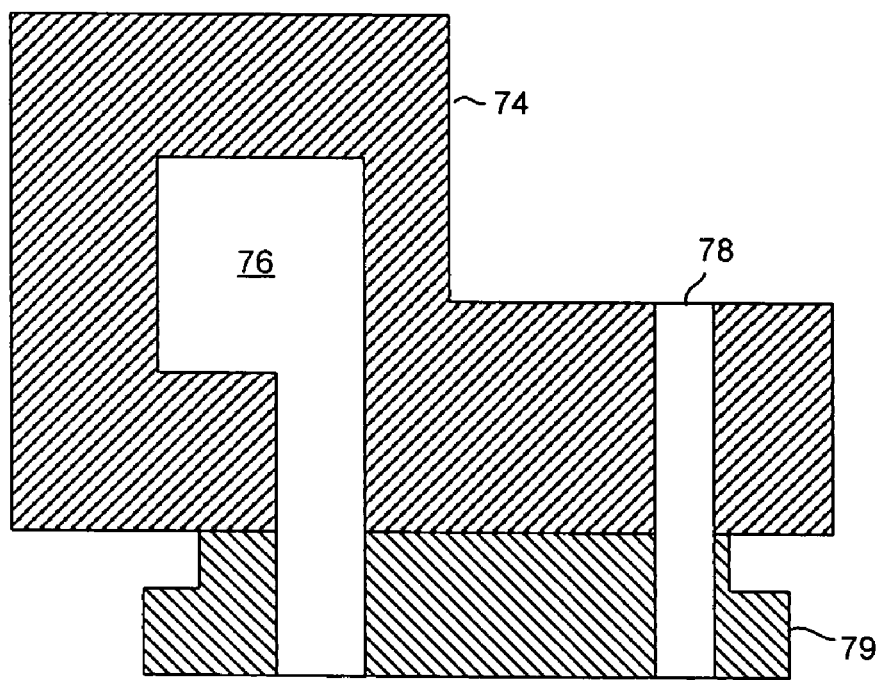
FIG. 7 illustrates a cross-section of a support frame.
Figure 8:
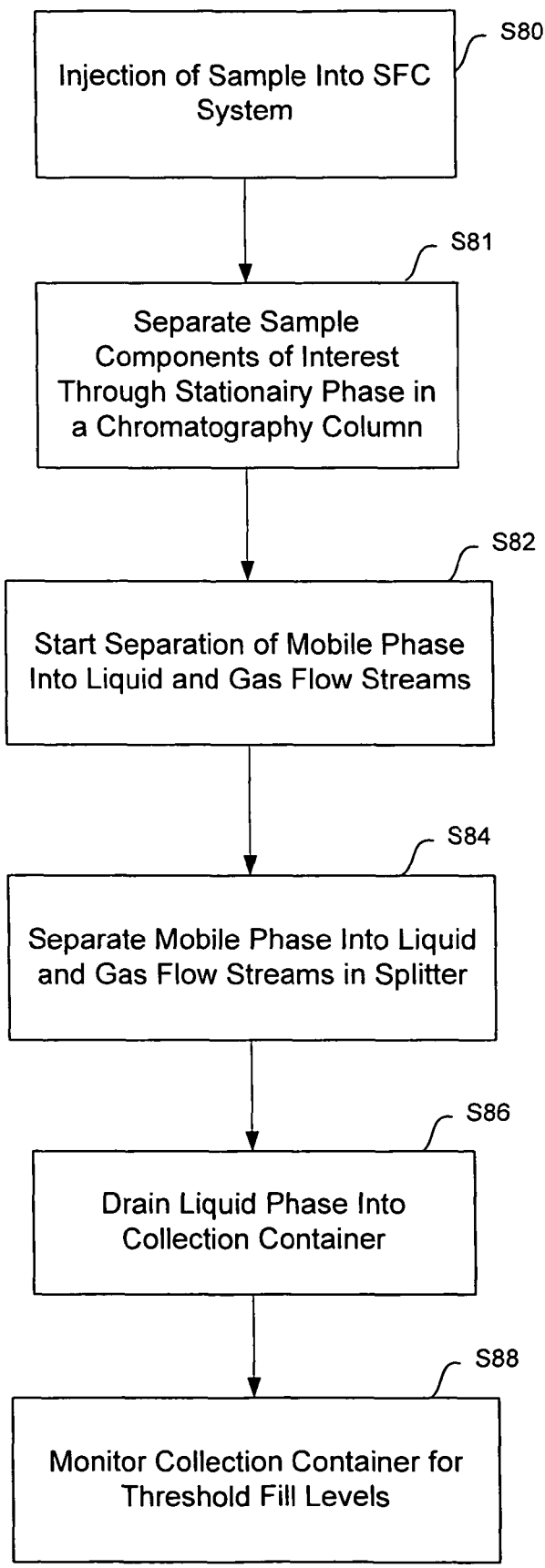
FIG. 8 is a flowchart of a method of the preferred embodiment.

Since physical separation of the flowstream is performed upstream of the liquid fraction collection container 50 in splitter 48, any number of collection containers can be implemented with the preferred embodiment having appropriate valving and tubing between each container and the system 10. FIG. 6 illustrates two discrete, upright collection splitters 48 and 49 preferably attached to a common manifold support structure 74. Splitter 48 receives a flowstream from line 58 and splitter 49 receives a flowstream from line 61. Liquid phase from splitter 48 drains through line 52 into collection container 50, and liquid phase from splitter 49 drains through line 55 into collection container 51. A cross-section A-A' of manifold support 74 is also illustrated in FIG. 7. Splitters 48 and 49 are attached to manifold 74 using appropriate airtight and pressure-tight connectors. A connector 79 connects to the top of a splitter device and creates an airtight and pressure-tight seal with manifold 74. Gas phase from both splitters 48 and 49 enter channel 76 which transfers to a waste system. Here, and in all configurations of the preferred and alternative embodiments, chemically sensitive seals for connections should be avoided. Seals that react with chemicals in the system can swell in-place and either restrict system flow and cause backpressure or fail and allow fluids to escape.

Although two collection systems 44 are shown in FIG. 6, an alternative embodiment of more than two devices could be used in a process by duplicating the configuration of devices and associated equipment shown. Separation of gasses from the mobile phase occurs quickly and simply in splitters 48 and 49, upstream of the collection containers 50 and 51. Thus, the large volumetric capacity of liquid phase retention in the present invention removes time-consuming bottlenecks caused by additional processes typically found in SFC sample solute collection processes and promotes rapid sample injection, elution, and collection.

Referring specifically to FIG. 7, manifold support 74 includes at least one hollow channel 78 (only one channel 78 is shown for illustrative purposes). Channel 78 receives mobile phase flow from tubing 58 and conducts the mobile phase flow stream into a splitter 48. Addition components connected to splitter 48 through manifold 74 may include a pressure sensor and gauge to measure pressure inside the splitter 48 during separation processes. The manifold 74 also provides a pathway out of splitters 48, 49 for waste gasses. Internal to manifold 74 is a common hollow channel 76 that communicates with each splitter where each splitter connects to the manifold 74 in connection 79. Channel 76 receives the gasses and vapors inside of each splitter that separate out of the mobile phase flow stream. The gasses are vented to an appropriate waste system.

The alternative embodiment has an advantage of allowing unattended process runs that can be combined with a rapid flowstream production process to provide a high volume of collection capacity without renewing the collection system. Unattended process runs may require monitoring fill levels in each collection container according to the description relating to FIG. 5. Instead of a shut-down of flowstream production by sensor 70 or system shutdown by sensor 72, when liquid reaches a threshold level sensor 70 in container 50, a valve could re-direct the flowstream to splitter 49 and container 51 without stopping the flowstream. A conventional method for monitoring fill levels would be to visually observe the height of liquid in each collection container.

Figure 9:
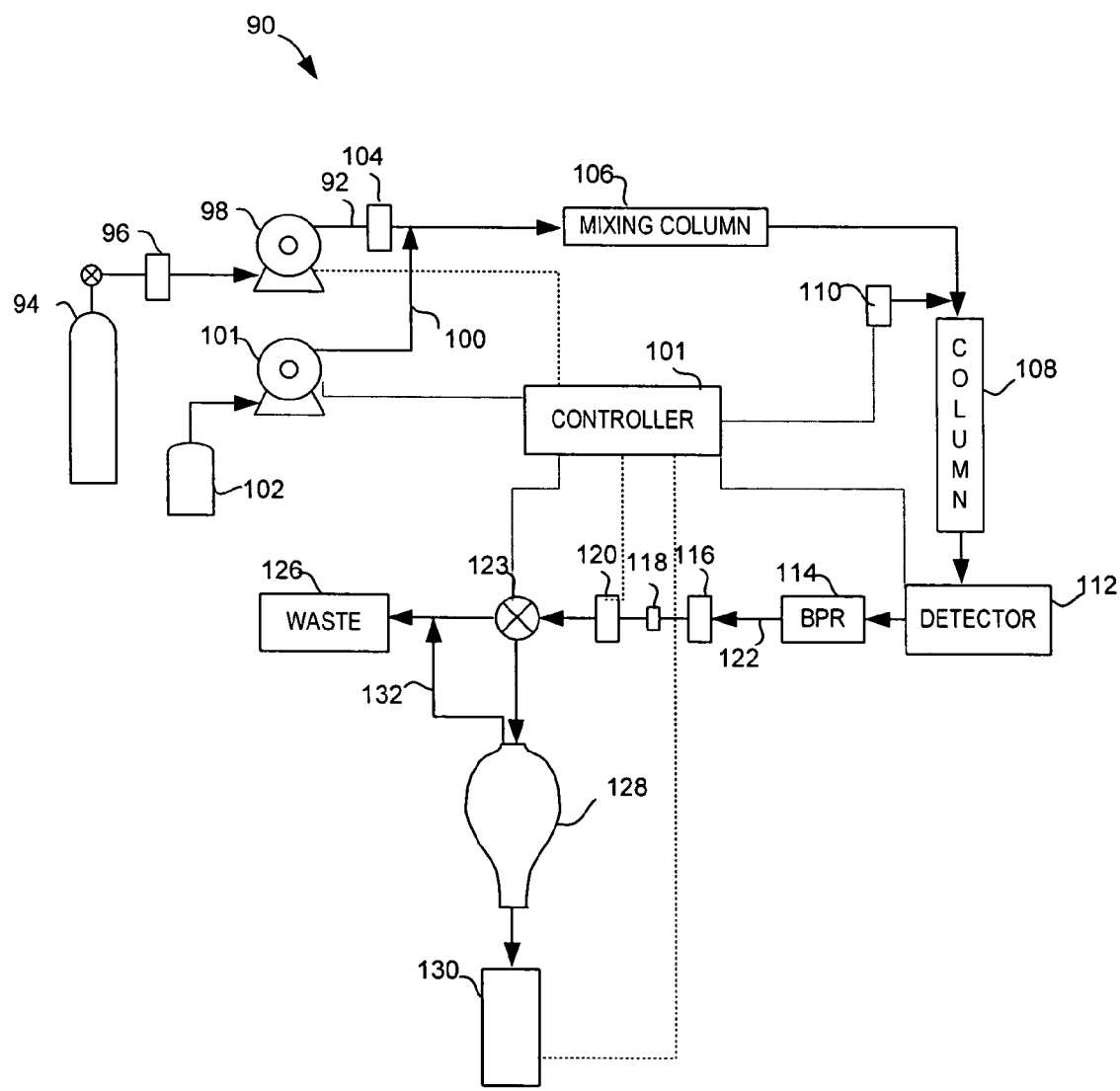
FIG. 9 illustrates an exemplary supercritical fluid chromatography system that can implement the collection splitter of the preferred embodiment.

FIG. 9 illustrates a flow diagram of an alternative embodiment of the present invention comprising a process stream fed from a supercritical fluid chromatography (SFC) or supercritical fluid extraction (SFE) system. For the purposes of the alternative embodiment, an SFC system is described. In general, dissolved samples carried through an SFC system also remain dissolved in the liquid organic modifier phase. The principle that simple decompression of the mobile phase in SFC separates the stream into two fractions has great importance with regard to use the technique in a preparative manner. Removal of a gaseous carbon dioxide ($CO_2$) phase, which constitutes 50% to 95% of the mobile phase during normal operation, greatly reduces the liquid collection volume for each component and thereby reduces the post-chromatograhic processing necessary for recovery of separated components. Expanding the technique of analytical SFC to allow preparative SFC requires several adaptations to the instrument. First the system requires increased flow capacity. Flows ranging from 10 ml/min to 200 ml/min are suitable for separation of multi-milligram up to gram quantities of materials.

In FIG. 9, SFC system 90 has a first flow stream 92 of a highly compressed gas, compressible liquid, or supercritical fluid. Although many compounds, liquid or gas, could be used in the first flow stream, the preferred embodiment supplies the first flow stream with liquefied carbon dioxide ($CO_2$) gas contained in cylinder 94. High pressure transfer tubing connects $CO_2$ source 94 to pump 98. Gas from tank 94 may be cooled through line chiller 16 prior to being compressed in pump 18. Downstream flow from pump 18 may have a dampener and pressure transducer 104 prior to mixing with a second flow stream 100. The second flow stream 20 is supplied from a relatively incompressible liquid, which in the preferred embodiment is a compound such as methanol that is supplied from modifier supply tank 102. The system uses two SFC-grade or modified reciprocating pumps that can supply adequate pressures and flow rates for the system 90. Pump 101 supplies modifier flow from tank 102 under pressure to mix with flow stream 92. Flow streams 92 and 100 combine and enter a mixing column 26, creating a mixture of modifier solvent dissolved into the supercritical fluid. The combined stream is pumped by pumps 98 and 101 at a controlled mass-flow rate and enters packed chromatography column 108.

The SFC system in the alternative embodiment can provide for flows of approximately 20 to 100 ml/min total flow ($CO_2$ plus modifier flow) in the highly compressed state from the pumping system. However, flowrates for alternative embodiments and SFC systems could range up to orders of magnitude higher or lower through adjustment or substitution of system hardware and flow parameters. Packed column 108 receives sample injection at its head from injector 110, where a sample of interest is injected into the flow system. Once a bi-phasic, mobile phase flowstream exits a column, expanding gas, such as $CO_2$, causes a severe temperature drop that has the possibility of forming dry ice and clogging the system. Since flows of preparative SFC systems are much higher than corresponding analytical systems, considerably more heat must be added to compensate for the temperature drop. Care must be taken, however, not to allow the actual temperature to rise in the flow system since this may cause damage to thermally unstable compounds of interest. Higher organic modifier content reduces the severity of this problem, both by adding heat capacity and by dissolving the $CO_2$, thereby preventing dry ice formation.

After fractionation of the sample occurs in the column 108, the elution mixture passes from the column outlet into a detector 112 and then enters backpressure regulator 114 (BPR). Expanded elution fluid exits the BPR 114 at a velocity of approximately two to five times the flow velocity upstream of BPR 34 and under pressure of approximately twenty to forty bars. Variations in the expansion occur as a result of the changing modifier solvent concentration from 2.5 to 50 percent over the course of a separation.

Initial separation of the liquid phased sample from $CO_2$ gas occurs immediately at the point of initial decompression within the BPR 114. By providing downstream restriction, a minimum backpressure sufficient to prevent the formation of solid $CO_2$ can be maintained while liquid $CO_2$ is present in the thermally-regulated transfer lines 122. The degree of $CO_2$ evaporation is a function of both the available heat transfer in this region and the downstream flow restriction which limits the amount of expansion available to the decompressing fluid. Due to the pressure drop across the BPR 114, a fraction of the emerging $CO_2$ will evaporate, typically causing a significant drop in the temperature of the emerging fluid.

Due to the expansion, linear velocities of the depressurizing fluid increase dramatically in the transfer tubing. Residual liquids of the system are moved along the flow path largely by shear forces from the expanding gas. This turbulent environment is ideal for the creation of aerosols, whereby very small droplets of modifier liquid are entrained in the gas phase as a "mist." It is a finding of this study that the aerosol formation within the transfer tubing can be almost completely controlled by proper temperature control of the expanding two-phase system. Aerosol formation is a greater problem at lower temperatures. It is a surprising finding of this work that higher levels of organic modifier with correspondingly lower $CO_2$ content require higher temperature levels to prevent visible aerosol formation.

From BPR 34, the flowstream passes one or more heaters, that may be mounted in series, to heat the elution fluid. In FIG. 9, evaporator heater 116 and a trim heater 120 are mounted in series after the BPR 114. The evaporator heater 116 is heated with an appropriately sized cartridge heater and controlled by an appropriate heater controller. Transfer tubing 122 is tightly coiled around the heating assembly and optimized for thermal contact. The elution fluid is heated to within the control temperature of the evaporator 114, which is between approximately 5 to 50 degrees C., to protect heat sensitive compounds from being damaged. The objective is to boil $CO_2$ out of the elution fluid as the fluid passes through the evaporator 116. To complete the required heat transfer, biphasic elution fluid inside transfer tubing 122 enters the final heat exchanger, which is a trim heater 120. In the preferred embodiment, the trim heater setting is typically above the evaporator setpoint. Heater 120 is used not only to suppress aerosol formation within the transfer tube 122 but also to control the level of dissolved $CO_2$ in the liquid phase.

During the $CO_2$ evaporation process within the first heated zone, significant separation between the gaseous $CO_2$ and liquid modifier occurs. However, the separation to pure $CO_2$ and pure organic modifier is never realized. Some organic modifier is typically evaporated into the gas state. The degree of evaporation is largely dependent on the absolute temperature of the fluids within the transfer tubing 122. While organic modifier evaporation does lead to lower recovery of liquid phase when it reaches a collector, it does not necessarily reduce the recovery of dissolved components of interest which do not typically have low enough boiling points to convert to vapor. A fraction of CO2 will also remain dissolved in the organic liquid modifier. Both temperature and pressure determine the amount of residual CO2. Higher temperatures reduce CO2 solubility while higher pressures increase CO2 solubility. Turbulent flow of the CO2 gas within the narrow tubing also produces a strong shearing force that propels the liquid down the walls of the transfer tube 42. This very turbulent flow frequently causes small droplets at the liquid surface to rip away from the bulk liquid and become entrained into the rapidly moving gas phase of the fluid down the transfer tube 122, which is called aerosol formation or "misting."

After thermal conditioning, the flowstream is directed by valve 123 into splitter 128. Separation of gasses from the mobile phase occurs in splitter 128 by creating the zones of restricted gas flow and unrestricted liquid flow, as described in the splitter 48 of the preferred embodiment. Further, the features and design of splitter 128 are also similar to those of the preferred splitter 48. Splitter 128 can perform separation of gas and liquid phases with either a continuous or pulsed flowstream. The creation of separation zones and the separation of gas and liquid phases are performed passively, where no pressure scheme is applied into splitter 128. Pressures within splitter 128 can range from 100 psi or less, but are preferably 5 psi and less. Liquid separated out of the flowstream has an unrestricted flow channel down into a separate collection container 130, which is similar in design and features of the collection container 50 for the preferred embodiment. Thus, the large volumetric capacity of liquid phase retention in the present invention removes time-consuming bottlenecks caused by additional processes typically found in SFC sample solute collection processes and promotes rapid sample injection, elution, and collection.

Sensors in system 90 can be connected to a controller 101 as shown in FIG. 9 similar to those described in the preferred embodiment. Controller 101 determines collection container 130 is nearly full, and the controller triggers an action to prevent overfilling of container 130. One action is to signal injector 110 to cease injection of additional samples. This action allows samples already in column 108 and mobile phase flow already in the system between column 108 and splitter 128 to complete chromatographic fractionation and to complete separation in splitter 128.

One skilled in the art will appreciate that the present invention can be practice by other than the described embodiments, which are presented for purposes of illustration and not limitation, and the present invention is limited only by the claims that follow

What is claimed is:

1. An assembly for collecting samples from a flowstream, the flowstream comprising a liquid and a gas under pressure, or a liquefied gas, or a gas at or near or above its critical pressure and temperature, the assembly comprising:
   1) a splitter vessel having i) at least one wall having an interior surface defining a chamber, and ii) a first outlet and iii) a second outlet, said first and second outlet ends being open and tapered to have a diameter narrower than the diameter of the chamber, said first outlet for discharging gas having a position at the top of said chamber and said second outlet positioned at the bottom of said chamber for discharging liquid;
   2) an angled inlet tube for delivering the flowstream to an interior wall of the splitter vessel at an angle below horizontal; and
   3) a collection container, connected to the outlet for liquid flow with a connection tube, that receives liquid flow from the splitter, wherein the connection tube diameter is sized to allow the liquid flow to drain from the splitter into the collection container while allowing quiescent gases from the collection container to flow into the splitter.

2. The device of claim 1, wherein the second outlet provides gravity drainage of the liquid phase out of the splitter.

3. The device of claim 1, wherein the inlet tube discharges the flowstream against an interior wall portion of the splitter that is formed at an angle towards the outlet for the liquid flow.

4. The device of claim 1, further comprising a manifold to hold a plurality of splitters in support, wherein the outlets for gas flow from each splitter are connected to a common manifold gas outlet.

5. The device of claim 1, wherein the process flow is generated by one of a supercritical fluid chromatography system and a supercritical fluid extraction system.

\* \* \* \* \*